June 8, 1948.  J. HILLIER  2,443,107
ELECTRON OPTICAL SYSTEM AND METHOD
Filed July 30, 1945  2 Sheets—Sheet 2
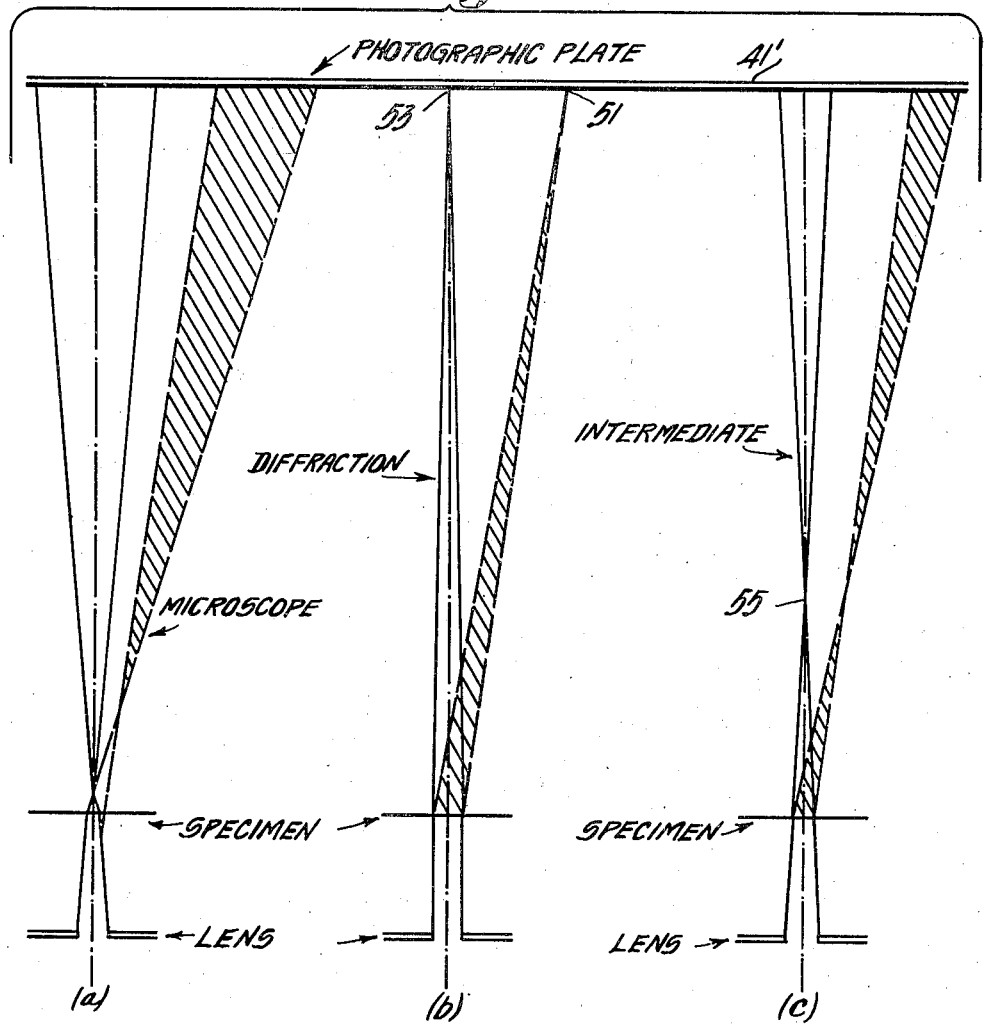

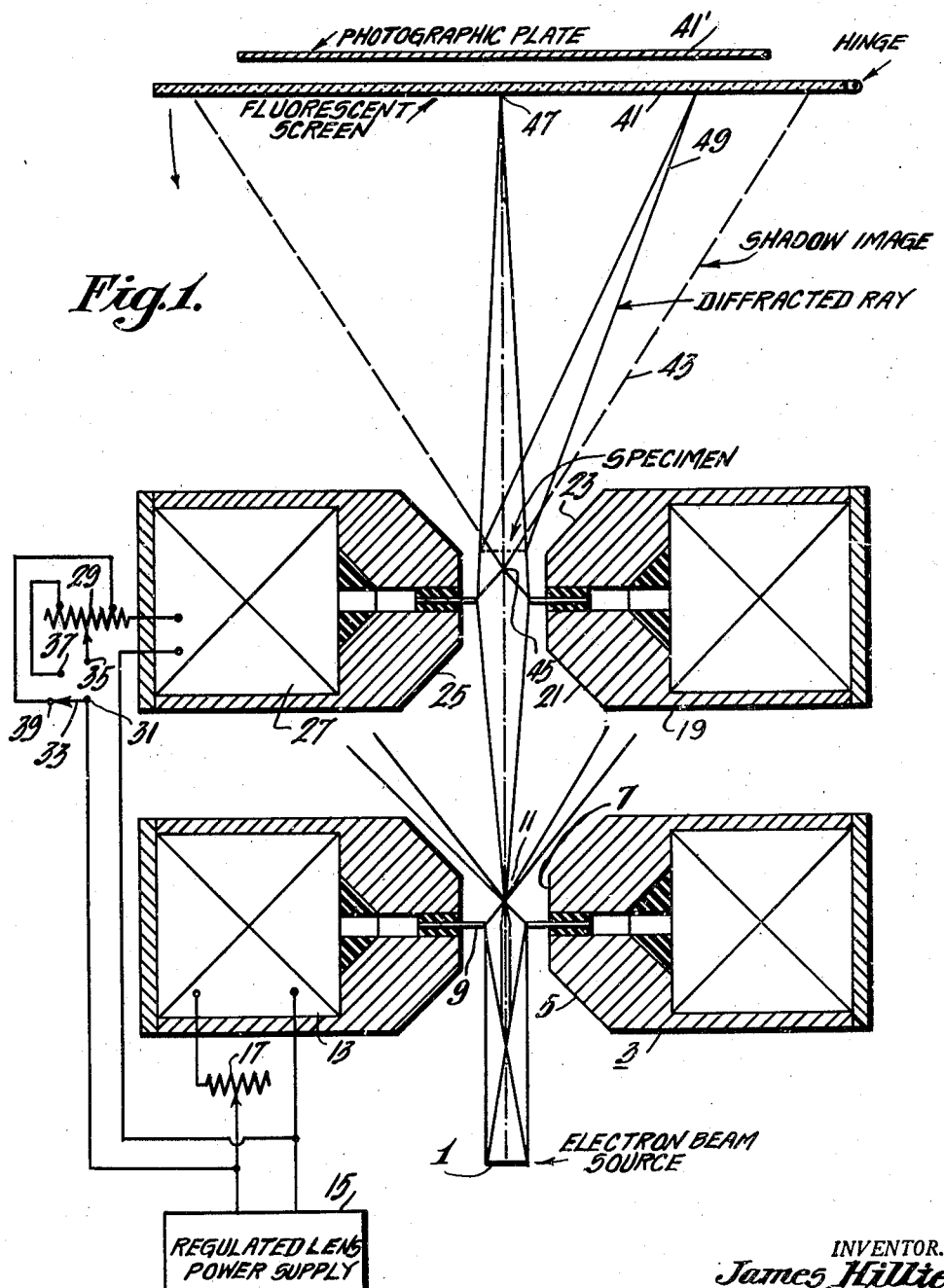

UNITED STATES PATENT OFFICE 2,443,107

ELECTRON OPTICAL SYSTEM AND METHOD

James Hillier, Cranbury, N. J., assignor to Radio Corporation of America, a corporation of Delaware Application July 30, 1945, Serial No. 607,849

10 Claims. (Cl. 250—49.5)

This invention relates generally to electron optical systems and methods and more particularly to an improved method of and means for exploring a microspecimen with an electron beam by selectively varying the focus of the electron beam with respect to the specimen to provide a shadow image, an electron diffraction pattern, or a combination of said image and said pattern on an electron responsive screen.

Immediately following the initial use of the electron diffraction camera as a means of demonstrating the wave properties of an electron beam, its further use as a means of electron analysis was recognized through analogy to X-ray diffraction methods. Early electron diffraction cameras followed the same basic technique as X-ray diffraction cameras, consisting essentially of the use of an electron source, a collimating system arranged to produce a narrow electron beam, a specimen subjected to said collimating beam, and a fluorescent screen including means for permanently recording the diffraction patterns. It was later found that the addition of a focusing lens on either side of the specimen greatly improved the sharpness of the diffraction patterns.

A focused diffraction camera attachment for a conventional electron microscope was disclosed and claimed by James Hillier and Richard F. Baker in their copending U. S. application Serial No. 441,142, filed on April 30, 1942, Patent No. 2,403,529, granted July 9, 1946. The device disclosed therein comprised a separate specimen chamber including a collimating aperture and a projection lens for focusing the diffraction pattern upon the fluorescent screen of the electron microscope. However the use of the diffraction camera attachment necessitated the transfer of the specimen from the microscope specimen chamber to the diffraction camera specimen chamber for obtaining electron diffraction patterns.

Another type of diffraction camera is disclosed and claimed in the copending application of Perry C. Smith, Serial No. 585,561, filed March 29, 1945, Patent No. 2,422,807, granted June 24, 1947, in which the electron source is focused to a relatively small spot on the specimen in order that a diffraction pattern of a minute area of said specimen might be obtained.

None of the previously disclosed electron diffraction cameras provided for careful correlation of the morphology of the specimen as observed in the light or electron microscope with the nature of the specimen material as shown by an electron diffraction pattern of the same portion of the specimen. Such correlation is extremely valuable for proper analysis of the portion of the specimen under observation.

The instant invention comprises an improved electron diffraction camera providing a sharply focused and magnified diffraction pattern at the fluorescent screen and includes means for selectively providing a shadow image of the same portion of the specimen at the fluorescent screen without the necessity of changing the position of the specimen in the system. Furthermore, means are provided for gradually dissolving from a sharply focused electron diffraction pattern, through a combination of a diffraction pattern and a shadow image, to a highly magnified shadow image of the specimen. The improved system utilizes an electron source and an electron focusing lens and limiting aperture for irradiating a selected minute area of the specimen under observation. A second electron lens having variable magnification and focus is disposed adjacent to the specimen. When the second lens is focused to a point closely adjacent to the specimen, a highly magnified shadow image is provided upon the fluorescent screen. As a focal point of the lens is moved toward the fluorescent screen, a combination shadow image and electron diffraction pattern is obtained on the screen for selected minute specimen areas. When the second lens is focused to a point on the fluorescent screen, a highly magnified, sharply focused diffraction pattern of the selected specimen area is provided on the screen. The focus of the second lens may be varied in discrete steps or it may be continuously adjustable for dissolving a shadow image to an electron diffraction pattern of high magnification which is sharply focused on the screen.

Previously known diffraction cameras have had insufficient resolving power to indicate diffraction ring widths of any but a few of the most common test specimens such as, for example, evaporated films of aluminum, silver or gold. However most other materials having natural ring widths as much as two orders of magnitude smaller than aluminum, silver or gold could not be satisfactorily observed. The sharply focused diffraction patterns provided by the instant system thus greatly extend the useful range of electron diffraction technique. Also the ability to observe the shadow image of the portion of the specimen under observation greatly facilitates electron analysis of specimen material.

It is difficult to assign a satisfactory value of resolving power to an electron diffraction camera since the derived resolution is a function of the ring diameter or of the lattice spacing producing a particular spot. If it is assumed that the focused electron beam at the position of the diffraction pattern consists of a circular disk of illumination of uniform intensity and of radius $d/2$, it can be shown that the minimum separation between distinguishable rings is $1.73\, d/2$, providing it is assumed further that the rings have no natural width and that the lenses are free of aberrations.

If, as is usually the case in electron diffraction patterns, the diameter of the ring is much greater than the electron spot size, the radial intensity distribution in a ring obtained by uniformly superimposing such spots is $I_x = k[(d/2)^2 - x^2]^{1/2}$ where $k$ is an instrumental constant, and $x$ is the radial distance from the center of the distribution. Thus the half value width $(1.73\, d/2)$ of this distribution may be employed as a measure of the resolving power providing that the rings to be resolved are of equal intensity.

Using Bragg's law and the geometry of the instrument, and assuming that the angle of deflection is small, the expression for the resolving power of an electron diffraction camera is:

$$(\Delta d_{hkl}/d_{hkl}) = (1.73 d \cdot d_{hkl}/2l\lambda) \qquad (1)$$

where $d_{hkl}$ is the lattice spacing, $l$ is the distance between the specimen and the photographic plate, and $\lambda = (150V)^{1/2}$ is the wavelength associated with a beam of $V$ electron volts energy.

In this expression:

$$(d/2) = (d_k \cdot m/2) + (v/f_2) kr^3 + S \qquad (2)$$

where $d_k$ is the diameter of the electron source, $m$ is the magnification of the lens system, $v$ is the distance between the final lens and the photographic plate, $f_2$ is the focal length of the final lens, $k$ is the spherical aberration constant of the final lens $(f_2 = f_{2_0}(1-kr^2))$, and $r$ is the radius of the aperture used in the final lens. The added term $S$ represents the change in spot size which arises as a result of the diffusing effect of any accumulated charge on the specimen.

In early types of single lens diffraction cameras it is found that the limiting resolving power is in the range of 1/70 to 1/170 for $d_{hkl}=1.5$ Angstrom units and $\lambda=.055$ Angstrom units. However for the improved double lens diffraction system described herein, the resolving power may be made to have a limiting value of better than $1/10000$ although this value is seldom attained in practice due to the appreciable effects of the specimen on the focusing of the spot.

The relatively high resolving power of the double lens system lends itself well to inclusion of the shadow microscope feature described heretofore. While the electron microscope images obtained in this manner are not of the high quality of those obtained with conventional electron microscopes, they are quite satisfactory for many purposes.

The resolving power of the instrument operated as a shadow type electron microscope is given by the expression:

$$d_i = (d_k m_1 m_2'/2) + (l\lambda/m_1)^{1/2} \qquad (3)$$

where $m_2'$ is the adjusted value of the magnification of the second lens and $m_1$ is the magnification (electronic) of the image of the specimen. In a practical case the focal length of the second lens is reduced from 10 cm. to 0.2 cm. (making $m_2'=0.023$) which leads to a resolving power of the order of 200 A.°, providing that the electronic magnification of the system is maintained above $10,000\times$.

Among the objects of the invention are to provide an improved method of and means for exploring a microspecimen by means of a focused electron beam. Another object is to provide improved methods of and means for selectively or simultaneously providing electron shadow images or electron diffraction patterns of a selected area of a microspecimen. An additional object of the invention is to provide a method of and means for employing a variable focus electron lens system for irradiating a microspecimen to selectively provide a magnified sharply focused diffraction pattern or a magnified shadow image of a selected area of the specimen. A further object of the invention is to provide an improved method of and means for continuously dissolving from a magnified shadow image to a magnified sharply focused diffraction pattern of a microspecimen. An additional object is to provide an improved method of and means for simultaneously producing a magnified shadow image and magnified focused diffraction pattern of a microspecimen. Another object is to provide an improved method of and means for providing simultaneously or selectively magnified shadow images or magnified focused electron diffraction patterns of a microspecimen in a fixed position within the resolving apparatus.

The invention will be described in further detail by reference to the accompanying drawing of which Figure 1 is a schematic diagram of a preferred embodiment thereof, and Figure 2 is a family of ray diagrams illustrating the focusing of the electron beam for providing shadow images, diffraction patterns, or a combination of images and patterns. Similar reference characters are applied to similar elements throughout the drawing.

Referring to the drawing, an intense, relatively small electron source 1, of the type ordinarily employed in conventional electron microscopes, is focused by means of a first electromagnetic lens 3 having pole pieces 5 and 7 and a limiting aperture device 9 to a focal point 11. The first electromagnetic lens 3 includes a solenoid winding 13 which is energized from a regulated lens power supply 15 through a variable series resistor 17 which may be adjusted to control the lens magnification and focus.

The paraxial portion of the focused electron beam derived from the first lens 3 is again focused by means of a second electron lens 19. The second electron lens 19 includes pole pieces 21, 23, and an extremely fine limiting aperture device 25. The field of the second lens 19 is provided by means of a second solenoid winding 27 which also is energized from the regulated lens power supply 15 through a second variable series resistor 29. A three-position switch 31 connected in the second lens circuit includes a movable switch arm 33 which may be operated to select any one of three fixed contacts 35, 37, and 39. The fixed contact 35 is connected to a movable contact on the second resistor 29, while the fixed contacts 37 and 39 are connected to relatively fixed positions on said second resistor. Thus, by actuation of the switch 31, either two fixed magnifications and focal lengths may be provided for the second lens 19, or the movable contact may be adjusted on the second resistor 29 to provide continuously variable magnification and focal length for said lens.

The microspecimen to be observed is located close to the second lens 19 and preferably intermediate the lens and a fluorescent screen 41. The fluorescent screen 41 may be hinged to permit impingement of the electron beam upon a photographic plate 41' disposed immediately behind the screen. The portion of the ray diagram shown in dash lines 43 indicates the manner in which a shadow image of the specimen may be formed at the fluorescent screen 41. The size and magnification of the shadow image will be determined by the distance from the specimen to the focal point 45 of the beam, and by the distance from the specimen to the fluorescent screen.

When the second lens 19 is adjusted to focus the electron beam to a point 47 on the fluorescent screen 41, a magnified, sharply-focused, diffraction pattern of the selected specimen area will be formed on the fluorescent screen, as indicated by means of the solid line diffracted ray 49 which is representative of a single focused diffraction ring.

Referring to Figure 2, it is seen that if the second lens power is adjusted to provide a focal point for the electron beam closely adjacent to the specimen (on either side of the specimen), a greatly magnified microscope shadow image will be provided at the fluorescent screen or photographic plate 41', as indicated in ray diagram (a). Ray diagram (b) illustrates the manner in which a diffraction ring is sharply focused at the point 51 on the fluorescent screen or photographic plate 41' when the second lens is adjusted to focus the electron beam at the point 53 at the center of said screen.

Ray diagram (c) shows an intermediate focal length for the electron beam wherein it is focused at a point 55 intermediate the specimen and the photographic plate 41'. With this adjustment of the power of the second lens 19, a shadow image of lower magnification and a diffraction pattern also of lower magnification and lacking sharp focus will be provided on the photographic plate 41'. The magnification of the shadow image and diffraction pattern as well as the focus of the diffraction pattern will vary continuously as the focal point 55 of the electron beam is varied intermediate the specimen and photographic plate 41'.

Thus the invention described comprises an improved method of and means for providing selectively or simultaneously electron shadow images or electron diffraction patterns of a specimen in a fixed position in the resolving apparatus. Means are provided for varying the magnification of a single lens for discretely or continuously dissolving from a highly magnified shadow image to a finely-focused diffraction pattern of the specimen.

I claim as my invention:

1. The method of exploring a specimen with an electron beam constituted of focused electron rays and producing indications of said exploration upon an electron-sensitive screen, said method comprising generating said electron rays, and selectively varying the focus of said rays with respect to said specimen and said screen for selectively providing a shadow image, an electron diffraction pattern or a combination of said image and said pattern of said specimen on said screen.

2. The method of exploring a specimen with an electron beam constituted of focused electron rays to selectively obtain electron shadow images and electron diffraction patterns of selected portions of said specimen, said method comprising generating said electron rays, selectively focusing said rays to a focal point adjacent said specimen to provide a shadow image of said specimen, and changing the focus of said rays for selectively electron irradiating a selected area of said specimen to provide an electron diffraction pattern of said selected specimen area.

3. The method of exploring a specimen with an electron beam constituted of focused electron rays, said method comprising generating said electron rays, selectively focusing said rays to a focal point adjacent to said specimen and intermediate said specimen and the source of said rays to provide a shadow image of said specimen, changing the focus of said rays to provide simultaneously a shadow image and an electron diffraction pattern of said specimen, and further changing the focus of said rays to provide a focused electron diffraction pattern of said specimen.

4. The method of exploring a specimen with an electron beam constituted of focused electron rays and producing indications of said exploration upon an electron-responsive element disposed on the side of said specimen remote from the source of said rays, said method comprising generating said electron rays, selectively focusing said rays to a focal point adjacent said specimen and intermediate said specimen and said source to provide an enlarged shadow image of said specimen at said element, changing the focus of said rays to a point intermediate said specimen and said element to provide a simultaneous shadow image and electron diffraction pattern of said specimen at said element, and further changing the focus of said rays to the plane of said element to provide a focused electron diffraction pattern of said specimen at said element.

5. The method defined in claim 4 wherein said focusing of said rays is changed in discrete steps.

6. The method defined in claim 4 wherein said focusing of said rays is changed continuously between predetermined focal limits.

7. An electron optical device including a source of electron rays, an electron-sensitive screen, means for supporting a specimen in the path of said rays intermediate said source and said screen, electron focusing means for said rays disposed intermediate said source and said specimen supporting means, and means operable upon said focusing means for selectively varying the focus of said rays from a point adjacent to said specimen and intermediate said specimen and said source to a point on said screen for selectively deriving an enlarged shadow image, an electron diffraction pattern, and a combined shadow image and diffraction pattern of said specimen on said screen.

8. An electron optical device including a source of electron rays, an electron-sensitive screen, means for supporting a specimen in the path of said rays intermediate said source and said screen, electron focusing means for said rays fixedly disposed intermediate said source and said specimen supporting means, and adjustable electrical energizing means operable upon said focusing means for selectively varying the focus of said rays from a point adjacent to said specimen and intermediate said specimen and said source to a point on said screen for selectively deriving an enlarged shadow image, an electron diffraction pattern, and a combined shadow image and diffraction pattern of said specimen on said screen.

9. Apparatus according to claim 8 including means for varying said focus of said rays in discrete steps.

10. Apparatus according to claim 8 including means for varying said focus of said rays continuously between predetermined focal limits.

JAMES HILLIER.

REFERENCES CITED

The following references are of record in the file of this patent:

UNITED STATES PATENTS

| Number | Name | Date |
|---|---|---|
| 2,233,264 | Marton | Feb. 25, 1941 |
| 2,253,864 | Muller | Aug. 26, 1941 |
| 2,274,215 | Ruska | Feb. 24, 1942 |
| 2,372,422 | Hillier | Mar. 27, 1945 |
| 2,382,739 | Muller | Aug. 14, 1945 |